(12) United States Patent
Matsui

(10) Patent No.: US 11,526,364 B2
(45) Date of Patent: Dec. 13, 2022

(54) METHOD, INFORMATION PROCESSING APPARATUS, AND STORAGE MEDIUM

(71) Applicant: Canon Kabushiki Kaisha, Tokyo (JP)

(72) Inventor: Yusuke Matsui, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 52 days.

(21) Appl. No.: 17/114,883

(22) Filed: Dec. 8, 2020

(65) Prior Publication Data

US 2021/0182079 A1    Jun. 17, 2021

(30) Foreign Application Priority Data

Dec. 11, 2019 (JP) .............................. JP2019-223754

(51) Int. Cl.
| | |
|---|---|
| *G06F 9/4401* | (2018.01) |
| *G06F 9/451* | (2018.01) |
| *G06F 8/61* | (2018.01) |
| *G06F 13/10* | (2006.01) |
| *G06F 9/54* | (2006.01) |

(52) U.S. Cl.
CPC .............. *G06F 9/4411* (2013.01); *G06F 8/61* (2013.01); *G06F 9/451* (2018.02); *G06F 9/546* (2013.01); *G06F 13/102* (2013.01)

(58) Field of Classification Search
CPC ........ G06F 13/102; G06F 8/61; G06F 9/4411; G06F 9/451; G06F 9/546
See application file for complete search history.

(56) References Cited

U.S. PATENT DOCUMENTS

| | | | | |
|---|---|---|---|---|
| 2002/0156947 | A1* | 10/2002 | Nishio | G06F 3/1225 710/36 |
| 2006/0221367 | A1* | 10/2006 | Shiokawa | H04N 1/00222 358/1.15 |
| 2008/0068635 | A1* | 3/2008 | Asano | G06F 3/1253 358/1.13 |
| 2009/0100422 | A1* | 4/2009 | Abe | G06F 8/61 717/174 |
| 2014/0022577 | A1* | 1/2014 | Osada | H04N 1/00204 358/1.13 |
| 2016/0350035 | A1* | 12/2016 | Horikoshi | G06F 8/61 |
| 2017/0279998 | A1* | 9/2017 | Nakagawa | H04N 1/32539 |

FOREIGN PATENT DOCUMENTS

JP        2016-224731 A    12/2016

* cited by examiner

*Primary Examiner* — Nimesh G Patel
(74) *Attorney, Agent, or Firm* — Venable LLP

(57) ABSTRACT

An object of the present disclosure is to suppress an increase in the time required for setting a peripheral device including driver installation. An embodiment of the present invention is a method including: a step for causing a display unit to display information of each of detected peripheral devices as a search result from a searching step; a step for causing a storage unit to store information of a peripheral device selected by a user from among the detected peripheral devices; an installation step for installing a driver that is compatible with the selected peripheral device; and a determination step for determining a port that is capable of communicating with the selected peripheral device, based on the information stored in the storage unit, wherein an installation process by the installation step and a communication-capable port determination process by the determination step are executed concurrently.

15 Claims, 16 Drawing Sheets

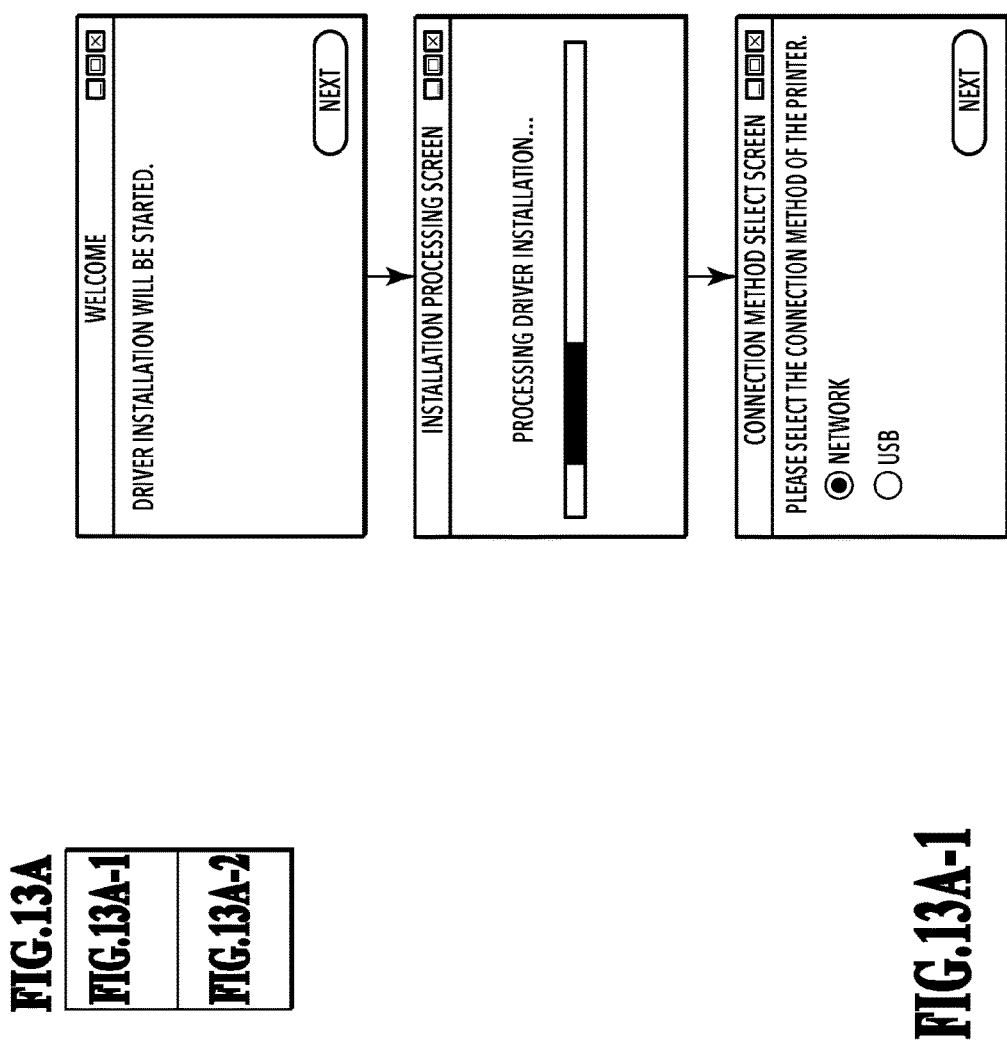

METHOD, INFORMATION PROCESSING APPARATUS, AND STORAGE MEDIUM

BACKGROUND OF THE INVENTION

Field of the Invention

The present disclosure relates to a method, an information processing apparatus, and a storage medium, and, particularly, relates to a technology for a process of installing a network device driver.

Description of the Related Art

In recent years, in the field of peripheral devices (hereinafter referred to as devices) of information processing apparatuses (hereinafter referred to as PCs), one device is equipped with multiple functions, not a single function. Examples of such a device include an MFP (Multi-Function Peripheral) equipped with not only a print function but also a scan function and a fax function, etc. Such a device can be connected to a PC via various interfaces such as USB (Universal Serial Bus) and a network. Especially, as for a network, it has become possible to share and utilize devices with multiple PCs and smart devices on the same network.

In accordance with devices becoming compatible with various interfaces, the method shown in FIG. 13A-1 and FIG. 13A-2 and FIG. 13B is known as a method for installing a device driver compatible with a specific device to a PC and searching for the specific device on various interfaces. FIG. 13A-1 and FIG. 13A-2 show a UI screen flow of a driver installer in consideration of the respective interfaces of the network and USB, and FIG. 13B shows a flow of processing executed by the PC according to the driver installer.

Conventionally, device search protocols have been uniquely developed by the manufacturer that develops the device. However, in recent years, as a standard function of an OS, it has become possible to search for a device compatible with the UPnP (Universal Plug and Play) protocol and install a device driver in association with a communication port compatible with the protocol. Furthermore, devices compatible with both the manufacturer's unique device search protocol and the OS standard device search protocol have become widespread.

In a case of using these device search protocols, there is a possibility that no device can be detected, depending on the network state and device state. In Japanese Patent Laid-Open No. 2016-224731, there is disclosed a method, which is used in the network port generation process shown in FIG. 13B, for communicating with devices by use of a device search protocol and specifying a communication port that is capable of communicating from among multiple communication ports.

SUMMARY OF THE INVENTION

In Japanese Patent Laid-Open No. 2016-224731, a driver installation process, a peripheral device search process, and a communication process executed in a network port generation process so as to determine a communication port that is capable of communicating are executed sequentially. For this reason, in a case where a response from a peripheral device takes time during the communication between the information processing apparatus and the peripheral device, the processing in each step takes time, which has an effect on the entire setting process of the peripheral device including driver installation.

Therefore, in view of the above-described problems, the object of the present disclosure is to suppress an increase in the time required for setting a peripheral device.

An embodiment of the present disclosure is a method including: a searching step for searching a peripheral device that is capable of communicating via a network; a step for causing a display unit to display information of each of detected peripheral devices as a search result from the searching step; a step for causing a storage unit to store information of a peripheral device selected by a user from among the detected peripheral devices; an installation step for installing a driver that is compatible with the selected peripheral device; and a determination step for determining a port that is capable of communicating with the selected peripheral device, based on the information stored in the storage unit, wherein an installation process by the installation step and a communication-capable port determination process by the determination step are executed concurrently.

Further features of the present invention will become apparent from the following description of exemplary embodiments with reference to the attached drawings.

BRIEF DESCRIPTION OF THE DRAWINGS

FIG. 13A-1 and FIG. 13A-2 show an overall flow of UI screens of a conventional application 401 and FIG. 13B is a flowchart illustrating an overall processing flow of a conventional application 401.

DESCRIPTION OF THE EMBODIMENTS

Hereinafter, a detail explanation is given of embodiments of the present invention with reference to the attached drawings. Note that the following embodiments do not limit the present invention according to scope of the patent claims. Further, every combination of the characteristics explained in the present embodiments is not necessarily essential to the solution provided by the present invention.

Note that, in the following description, it is described that multiple processes are concurrently (or parallelly) executed. Here, "concurrently" (or "parallelly") includes a case where multiple processes are executed at the same time and a case where parts of multiple processes are executed alternately. In the latter case, for example, it is assumed that Process A is started, and Process B is started before Process A is completed. Further, for example, a case where respective parts of Process A and Process B are alternately executed in a minute time is also included in "concurrently". In this case, strictly speaking, Process A and Process B are not executed at the same time, but Process B is executed before Process A is completed, and therefore, for example, for the user, both are executed at the same time.

First Embodiment

<System Configuration>

Figure 1:
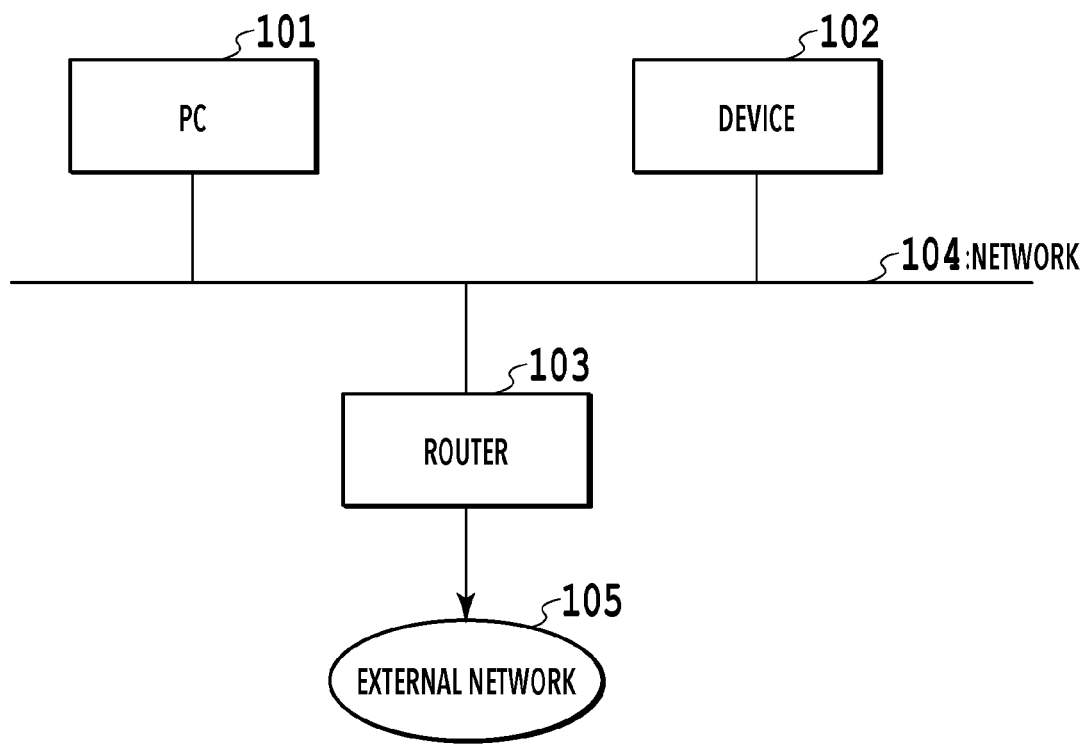
FIG. 1 is a block diagram illustrating a system configuration in the first embodiment.

FIG. 1 is a block diagram illustrating an example of a configuration of a network system including the information processing apparatus (hereinafter referred to as the PC) 101 in the present embodiment. In the system illustrated in FIG. 1, the PC 101, the peripheral device (hereinafter referred to as the device) 102, and the router 103 are connected via the network 104. Each apparatus performs communication according to TCP/IP (Transmission Control Protocol/Internet Protocol) and UDP (User Datagram Protocol). The network 104 is connected to the external network 105 via the router 103.

Specifically, the device 102 is a peripheral device, such as a printer, a copier, a facsimile, or a scanner, or an apparatus having multiple functions as such. In addition, the device 102 is compatible with TCP/IP and also compatible with the WSD (Web Services on Devices) protocol, which is a Windows OS standard network protocol that is compatible with UPnP. Furthermore, the device 102 is also compatible with the LLMNR (Link-Local Multicast Name Resolution) protocol, which allows name resolution of nearby network devices. Note that, regarding the WSD function and LLMNR function of the device 102, the user can directly operate the device 102 in order to switch between enabling and disabling the functions. The router 103 has a DHCP (Dynamic Host Configuration Protocol) server function and assigns IP addresses to the PC 101 and the device 102.

<Hardware Configuration of the PC 101>

Figure 2:
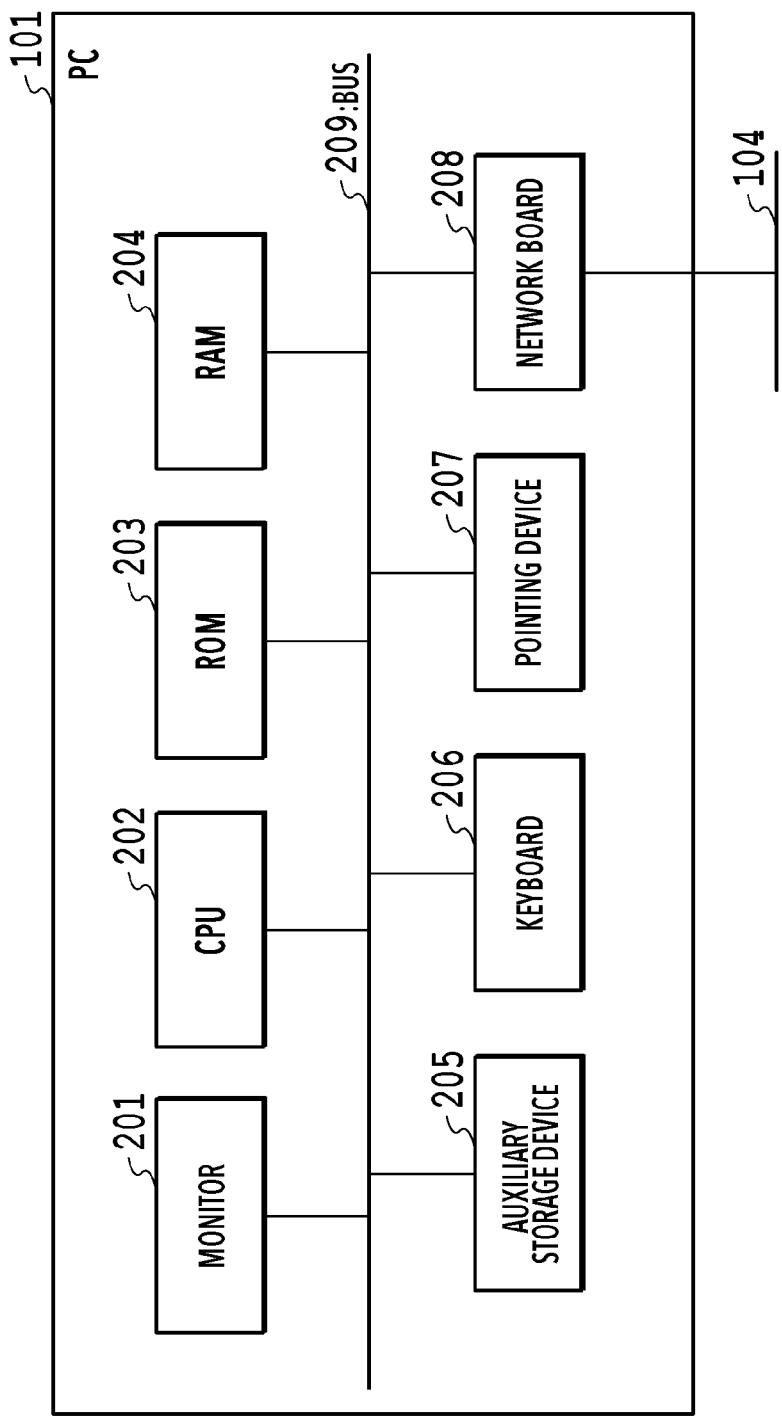
FIG. 2 is a block diagram illustrating a hardware configuration of a PC 101 in the first embodiment.

FIG. 2 is a block diagram illustrating a hardware configuration of the PC 101. The PC 101 includes a monitor 201, a CPU 202, a ROM 203, a RAM 204, an auxiliary storage device 205, a keyboard 206, a pointing device 207, and a network board 208. Each of the constituent elements is mutually connected via the bus 209, and data can be sent or received among the constituent elements.

On the monitor 201, a user interface (hereinafter referred to as a UI) of an application such as the application 401 (see FIG. 4) or a driver is displayed. The UI includes a GUI (Graphical User Interface). The CPU 202 loads a program such as an application or a driver, which is stored in the ROM 203 or the auxiliary storage device 205, into the RAM 204 and executes the loaded program. Accordingly, the processes in the present embodiment explained below are executed.

The ROM 203 stores basic software such as a BIOS and various programs for implementing processes executed by the PC 101. Software, such as an application and driver, and data utilized by the software are temporarily stored in the RAM 204. The auxiliary storage device 205 is, for example, a hard disk. The auxiliary storage device 205 stores software (programs) such as an OS, an application, a driver, and various modules.

Drivers stored in the auxiliary storage device 205 include a device driver (a scanner driver, a printer driver, a facsimile driver, or the like) that controls the device 102. Further, drivers stored in the auxiliary storage device 205 include a display control driver for controlling the display on the monitor 201, a keyboard driver for controlling the keyboard 206, and a pointing device driver for controlling the pointing device 207. Moreover, drivers stored in the auxiliary storage device 205 include a network driver for controlling communication of the network board 208.

Applications stored in the auxiliary storage device 205 include the application 401 according to the present embodiment. The application 401 has an information setting function and device search function based on TCP/IP. Note that it is also possible that the application 401 calls a module having these functions and causes the module to execute these functions. Note that it is also possible that these search function and information setting function are provided in separate modules. The keyboard 206 and the pointing device 207 are input devices for inputting instructions from the user. The network board 208 communicates with the device 102 outside the PC 101 via the network.

<Hardware Configuration of the Device 102>

Figure 3:
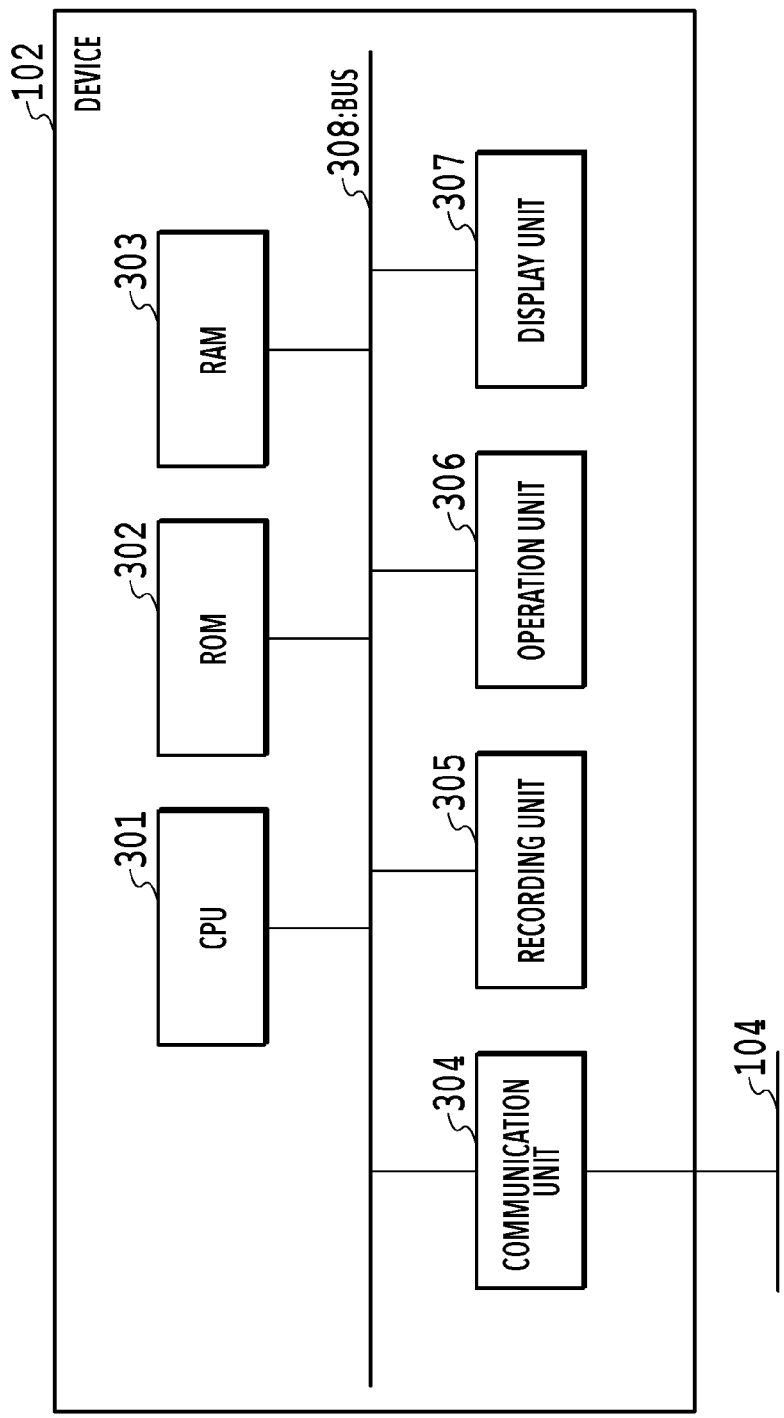
FIG. 3 is a block diagram illustrating a hardware configuration of a device 102 in the first embodiment.

FIG. 3 is a block diagram illustrating a hardware configuration of the device 102. Note that, although the case in which the device 102 is a printer is illustrated in FIG. 3, it is also possible that, as described above, an apparatus other than a printer is adopted as the device 102.

The device 102 includes a CPU 301, a ROM 302, a RAM 303, a communication unit 304, a recording unit 305, an operation unit 306, and a display unit 307. These constituent elements configuring the device 102 are mutually connected via the bus 308, so that it is possible to send or receive data among the constituent elements. The CPU 301 functions as a central processing unit of the device 102 and is a microprocessor, for example. The CPU 301 controls the communication unit 304, the recording unit 305, the operation unit 306, and the display unit 307 by loading programs stored in the ROM 302 into the RAM 303 and executing the loaded programs.

The ROM 302 stores various programs for implementing processes executed by the device 102. The RAM 303 is used as a work area of the CPU 301. Various data are temporarily stored in the RAM 303. The communication unit 304 communicates with another device such as the PC 101 outside the device 102 via the network.

The recording unit 305 records (prints) an image on a recording medium such as paper according to the recording data created based on image data included in a print job, for example. The operation unit 306 is configured with an input device such as a button or a touch panel, so that the user provides an input to the device 102 via the operation unit 306. The display unit 307 displays a GUI such as a screen for operating the device 102 and various information of the device 102, so that the user visually recognizes the contents displayed on the display unit 307.

Note that, in a case where the device 102 is a device other than a printer, the device 102 includes other constituent elements instead of the recording unit 305 or in addition to the recording unit 305. For example, in a case where the device 102 is a scanner, the device 102 includes a reading unit that reads the image on a document as another constituent element.

<Software Configuration of the Application 401>

Figure 4:
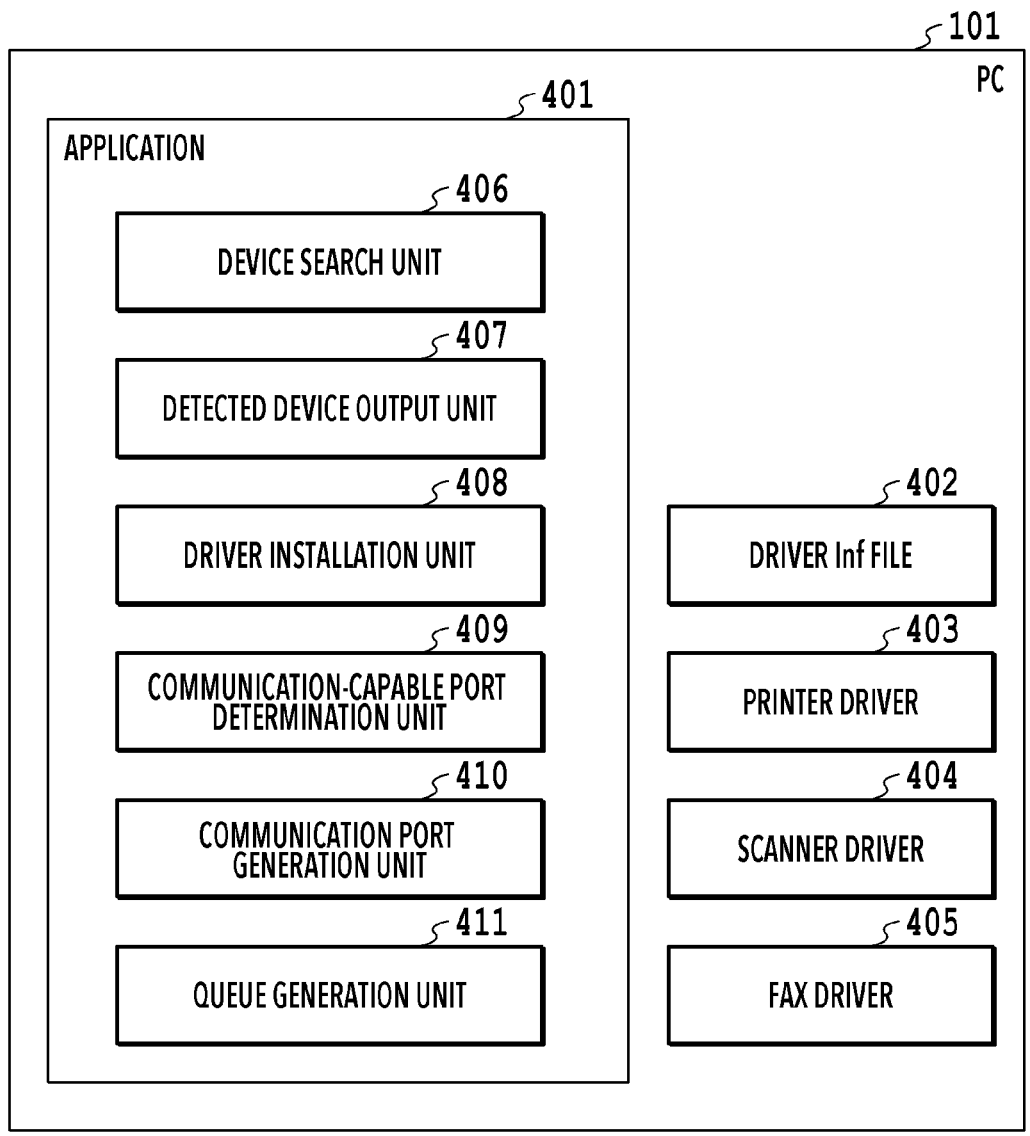
FIG. 4 is a block diagram illustrating a software configuration of the PC 101 in the first embodiment.

FIG. 4 is a block diagram illustrating a configuration of an application included in the PC 101 for allowing the PC 101 to communicate with the device 102. As illustrated in FIG. 4, the PC 101 includes an application 401, a driver INF file 402, a printer driver 403, a scanner driver 404, and a fax driver 405.

The application 401 is a driver installer that installs a driver of the device 102 in the PC 101. Specifically, the application 401 searches for devices (including the device 102) connected to the PC 101 and causes the monitor 201 to display information related to the detected devices. Thereafter, a driver of the device corresponding to the information selected by the user from the displayed information is installed in the PC 101.

The driver INF file 402 includes device-specific information such as device model information of devices compatible with the driver installed by the application 401 (in the present example, any one or more of the drivers 403 to 405).

The application 401 includes a device search unit 406, a detected device output unit 407, a driver installation unit 408, a communication-capable port determination unit 409, a communication port generation unit 410, and a queue generation unit 411. Each unit illustrated in FIG. 4 is implemented by the CPU 202 of the PC 101 reading and executing a program of the application 401 stored in the ROM 203 or the auxiliary storage device 205. In the present embodiment, the application 401 searches for devices on the same network and displays information of detected devices on the monitor 201. On the other hand, in a case where no device can be searched on the same network, the application 401 displays on the monitor 201 that no device has been detected.

The device search unit 406 compares the device name information of the target device (the model of the device compatible with the application 401) obtained from the driver INF file 402, which includes driver information, with the device name information of the devices searched by the device search unit 406.

In a case where the device name information of a device searched by the device search unit 406 and the device name information of the target device obtained from the driver INF file 402 match, the detected device output unit 407 displays information of the matched device on the monitor 201. The user selects a device that is desired (referred to as a desired device) from a list of devices displayed on the monitor 201.

The driver installation unit 408 installs a driver compatible with the device selected by the user from the list displayed by the detected device output unit 407. Note that the driver to be installed by the driver installation unit 408 differs depending on the device type selected by the user from the list displayed by the detected device output unit 407. For example, in a case where the device selected by the user is a printer, the application 401 installs the printer driver 403 in the PC 101. Further, in a case where the device selected by the user is a scanner, the application 401 installs the scanner driver 404 in the PC 101. Moreover, in a case where the device selected by the user is an MFP, the application 401 installs at least one of the scanner driver 404 and the fax driver 405 in the PC 101 in addition to the printer driver 403.

The communication-capable port determination unit 409 communicates with the device selected by the user by use of multiple device search protocols, so as to judge and determine which communication-capable port is the most suitable communication-capable port for the device.

The communication port generation unit 410 generates the communication-capable port determined by the communication-capable port determination unit 409.

The queue generation unit 411 generates a queue, which is associated with various drivers installed by the driver installation unit 408 and the communication port generated by the communication port generation unit 410, in the PC 101.

<GUI of the Application 401>

Figure 5:
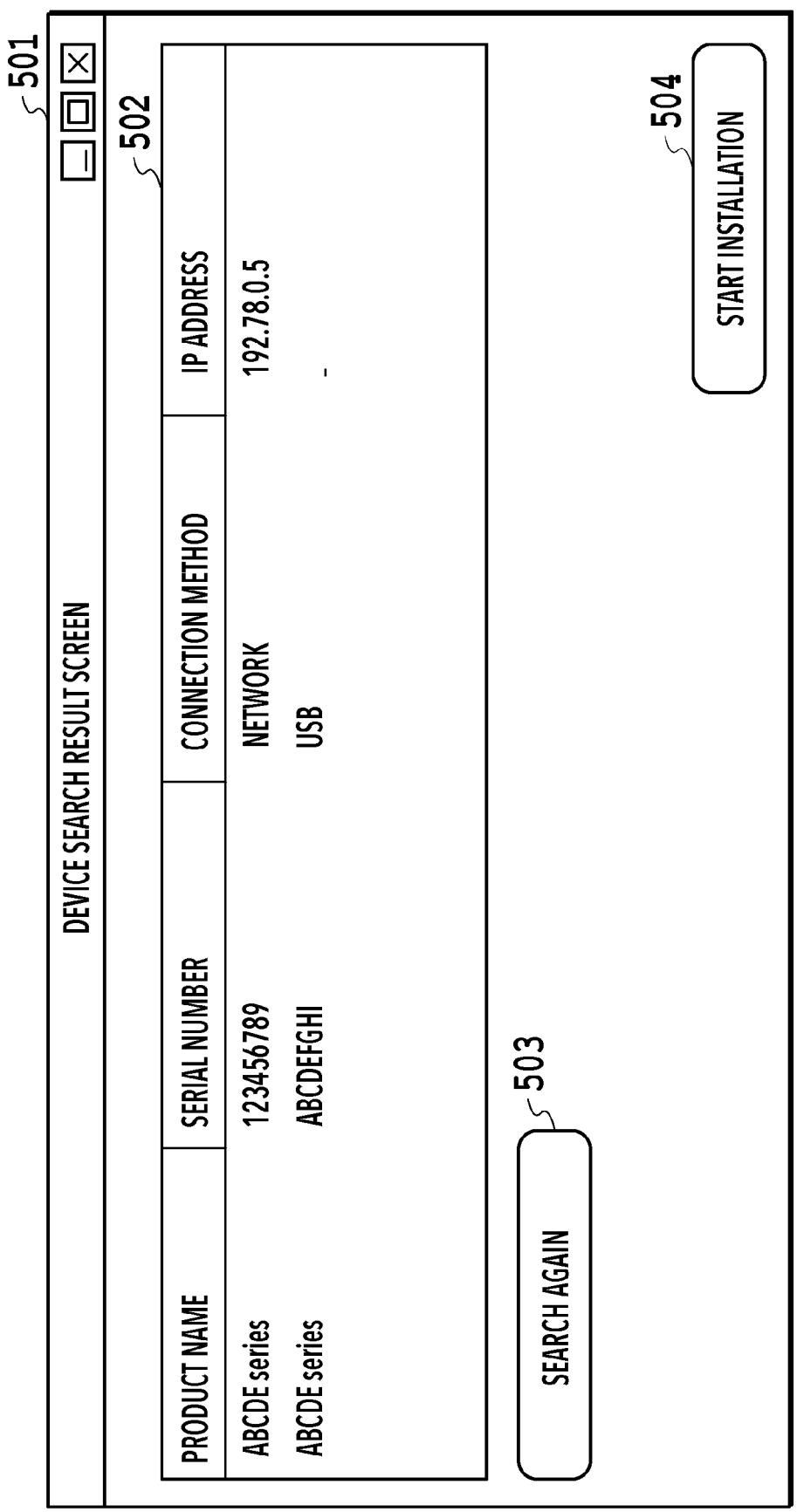
FIG. 5 is a screen showing a device search result, which is displayed by an application 401 in the first embodiment.

FIG. 5 is a diagram illustrating a screen (referred to as a device search result screen) 501, which shows a device search result from the detected device output unit 407, as an example of a GUI of the application 401 displayed on the monitor 201.

Figure 6A:
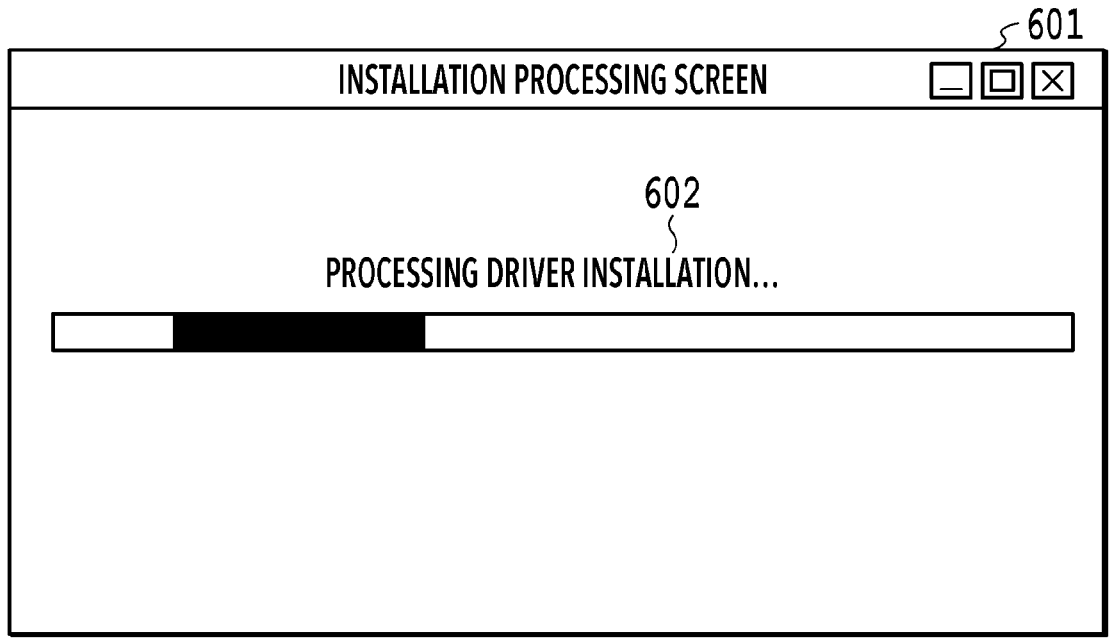
FIG. 6A is a screen during an installation process, which is displayed by the application 401 in the first embodiment.

In FIG. 6A, an example of the GUI of the application 401 is illustrated. Specifically, in FIG. 6A, a screen (referred to as an installation processing screen) 601, which is displayed in a case where the processing of the driver installation unit 408, the communication-capable port determination unit 409, the communication port generation unit 410, and the queue generation unit 411 is being executed, is illustrated. On the installation processing screen 601, the status of the internal processing is indicated by use of the message 602. For example, in a case where the driver installation unit 408 is executing the driver installation process, the message 602 such as "PROCESSING DRIVER INSTALLATION . . . " is displayed as illustrated in FIG. 6A.

Figure 6B:
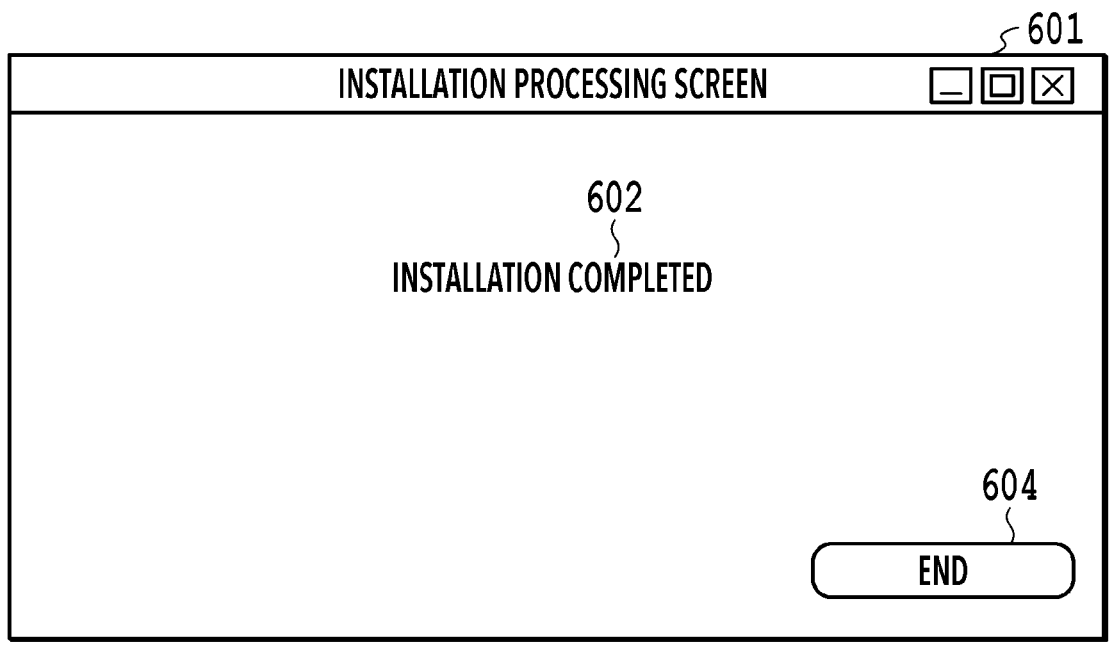
FIG. 6B is a screen for notification of completion of installation, which is displayed by the application 401 in the first embodiment.

FIG. 6B is a diagram illustrating an example of the GUI of the application 401, which is displayed after the internal processing (specifically, the driver installation process) illustrated in FIG. 6A is completed.

<Processing of the Application 401>

Figure 7A:
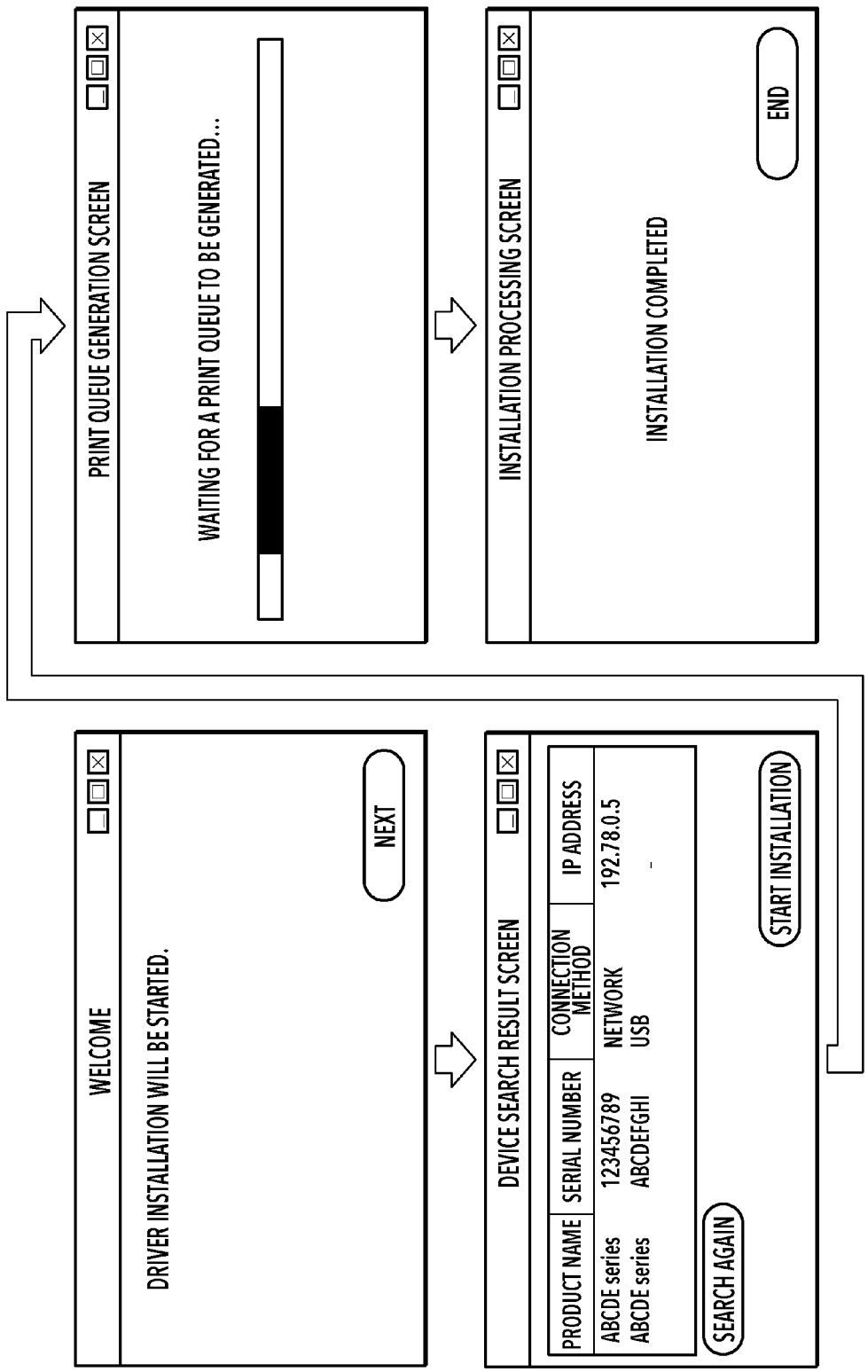
FIG. 7A is an overall flow of UI screens of the application 401 in the first embodiment and FIG. 7B is a flowchart illustrating an overall processing flow of the application 401 in the first embodiment.
Figure 7B:
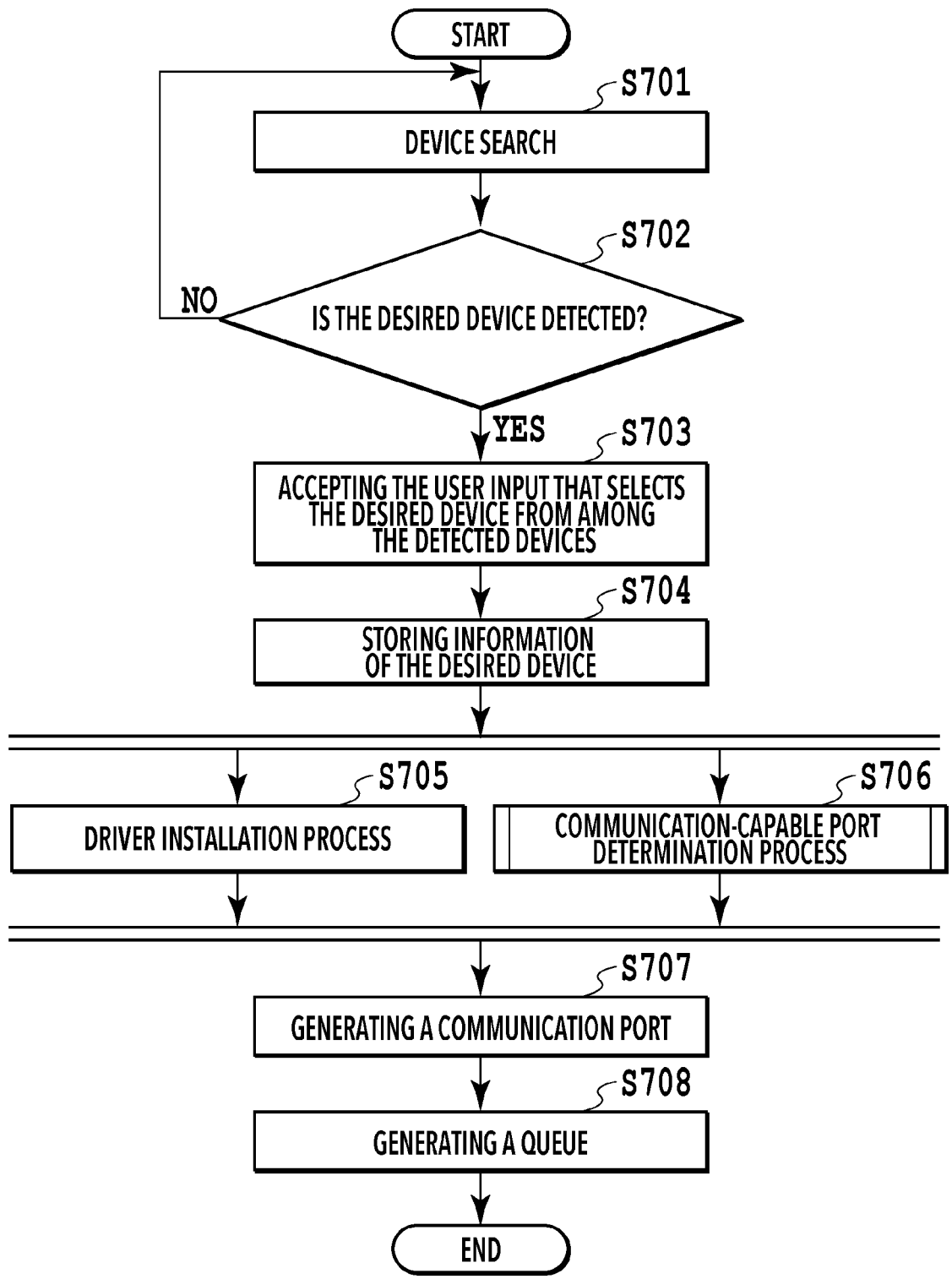

Hereinafter, the processing executed according to the application 401 in the present embodiment will be explained with reference to FIG. 7A and FIG. 7B. In FIG. 7A, the transition of the GUI displayed on the monitor 201 in a case where the CPU 202 of the PC 101 executes the application 401 is illustrated. FIG. 7B is a flowchart illustrating the overall processing flow in the case where the CPU 202 of the PC 101 executes the application 401.

First, in a case where the user activates the application 401, the CPU 202 displays the device search result screen 501, which is illustrated in FIG. 5. After the CPU 202 displays the device search result screen 501, in Step S701, the device search unit 406 automatically starts searching for devices connected to the PC 101. Here, not only via the network, it is also possible that devices connected via different interfaces (for example, a USB cable, etc.) are searched at the same time. In a case where the device search unit 406 finishes searching devices, the search result of detected devices and the like is displayed in the device list 502. Note that, in the following, "Step S . . . " is abbreviated as "S . . . ".

In S702, the user checks the device list 502 and determines whether the desired device is included in the device list 502 or not. In a case where the desired device is included in the device list 502, the processing proceeds to S703. On the other hand, in a case where the desired device is not included in the device list 502, such as in a case where no device is displayed, and the user presses the search again button 503 (see FIG. 5), the processing returns to S701, so that the device search unit 406 executes the device search process again. Note that, in the case where the user presses the search again button 503, the displayed contents of the device list 502 are cleared.

After S702, the user selectively determines the desired device from among the devices displayed in the device list 502, that is, specifically, the user selects the desired device from among the devices displayed in the device list 502 and presses the start installation 504 button. Then, in S703, the CPU 202 accepts this user input.

After S703, the screen displayed on the monitor 201 is switched from the device search result screen 501 to the driver installation processing screen 601. Here, in S704, the CPU 202 functions as a storage control unit, so as to store the network information (IP address, etc.) of the device selected by the user in the RAM 204.

After S704, the CPU 202 executes the driver installation process of S705 and the communication-capable port determination process of S706 concurrently (parallelly). Here, the driver installation process is executed by the driver installation unit 408, and the communication-capable port determination process is executed by the communication-capable port determination unit 409. Upon completion of both of the driver installation process (S705) and the communication-capable port determination process (S706), the processing proceeds to S707.

In S707, the communication port generation unit 410 generates a communication port according to the result of the communication-capable port determination process in S706. Upon completion of the communication port generation process of S707, the processing proceeds to S708.

In S708, the queue generation unit 411 generates a queue that is associated with various drivers installed by the driver installation unit 408 in S705 and the communication port generated by the communication port generation unit 410 in S707. Upon completion of the queue generation process in S708, the CPU 202 displays a screen (see FIG. 6B) indicating the completion of the installation process on the monitor 201. Thereafter, in a case where the user presses the end button 604, the series of processes illustrated in FIG. 7B ends, and the application 401 ends.

<Communication-Capable Port Determination Process>

Figure 8:
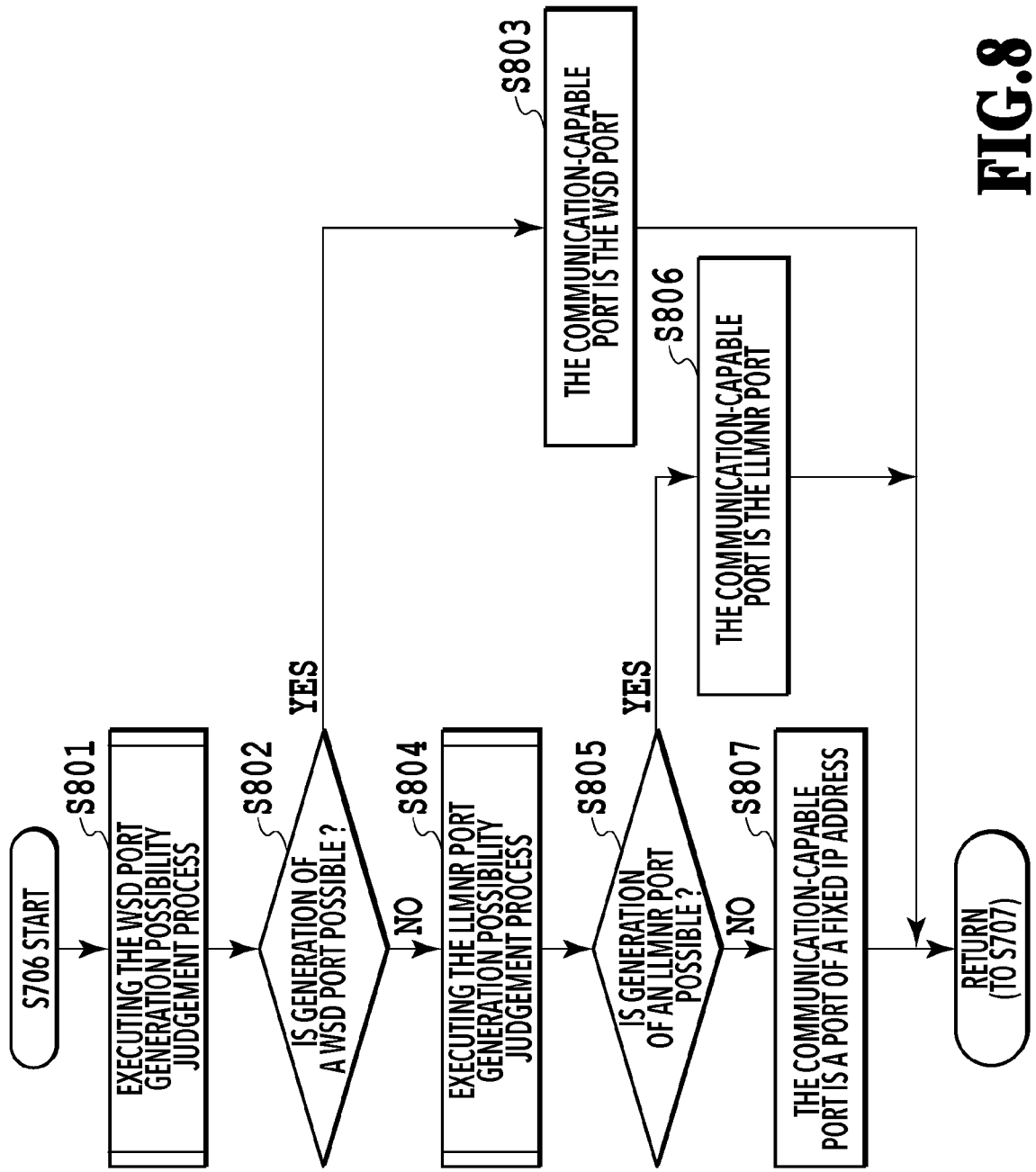
FIG. 8 is a flowchart of a communication-capable port determination process in the first embodiment.

FIG. 8 is a flowchart illustrating the flow of the communication-capable port determination process (S706 in FIG. 7B). In the communication-capable port determination process, a priority order is set for communication ports, so that, specifically, a process of judging whether generation of a communication port is possible or not is executed for the protocols in descending order of the priority order. Note that the priority order of the communication ports in the present embodiment is in the order of the WSD protocol, the LLMNR protocol, and a fixed IP address.

First, in S801, the communication-capable port determination unit 409 executes a process of judging whether generation of a communication port based on the WSD protocol (referred to as a WSD communication port, a WSD port, or the like) is possible or not (referred to as a WSD port generation possibility judgement process) and then receives the result thereof. Note that the details of the WSD port generation possibility judgement process will be described later with reference to FIG. 9.

In S802, the communication-capable port determination unit 409 judges whether generation of a WSD communication port is possible, based on the result of executing the WSD port generation possibility judgement process in S801. In a case where the judgement result of the present step is YES, the processing proceeds to S803. Contrarily, in a case where the judgement result of the present step is NO, the processing proceeds to S804.

In S803, the communication-capable port determination unit 409 determines that the communication-capable port is the WSD port and the communication-capable port determination process ends.

In S804, the communication-capable port determination unit 409 executes a process of judging whether generation of a communication port based on the LLMNR protocol (referred to as an LLMNR port) is possible or not (referred to as an LLMNR port generation possibility judgement process) and then receives the result thereof. Note that the details of the LLMNR port generation possibility judgement process will be described later with reference to FIG. 10.

In S805, the communication-capable port determination unit 409 judges whether generation of an LLMNR port is possible, based on the result of executing the LLMNR port generation possibility judgement process in S804. In a case where the judgement result of the present step is YES, the processing proceeds to S806. Contrarily, in a case where the judgement result of the present step is NO, the processing proceeds to S807.

In S806, the communication-capable port determination unit 409 determines that the communication-capable port is the LLMNR port and the communication-capable port determination process ends.

In S807, the communication-capable port determination unit 409 determines that the communication-capable port is a port of a fixed IP address and the communication-capable port determination process ends.

<WSD Port Generation Possibility Judgement Process>

Figure 9:
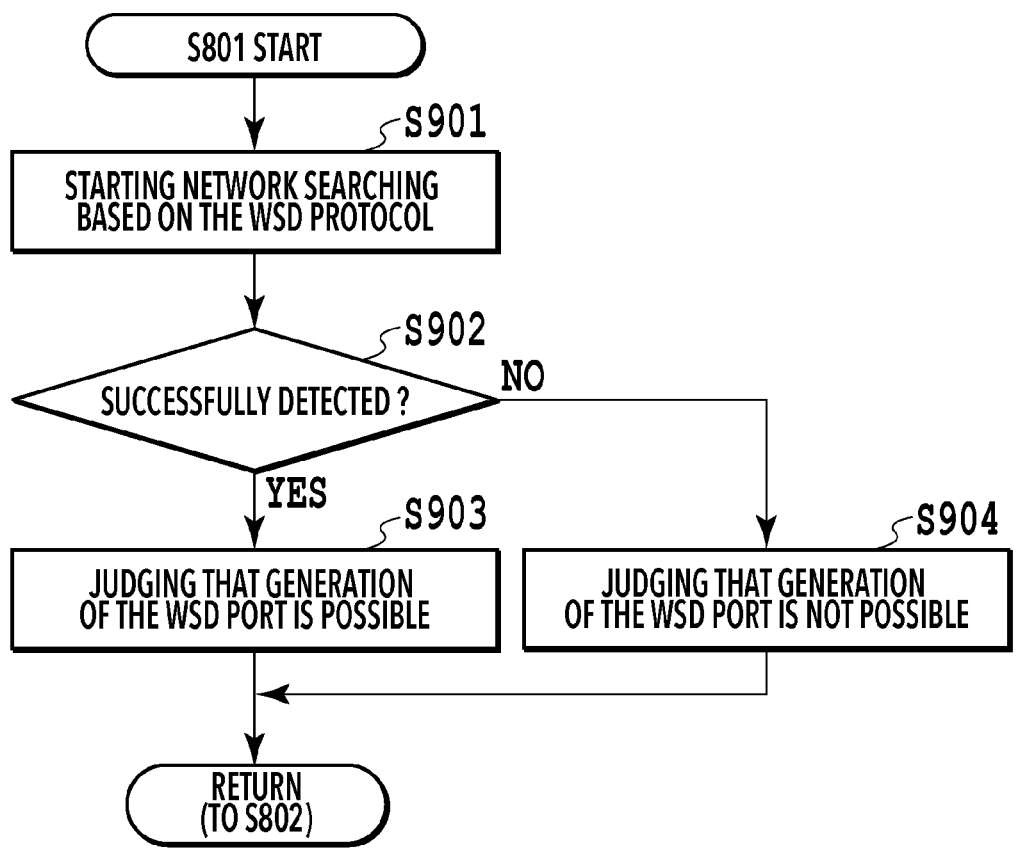
FIG. 9 is a flowchart of a WSD port generation possibility judgement process in the first embodiment.

FIG. 9 is a flowchart illustrating the flow of the WSD port generation possibility judgement process (S801 in FIG. 8).

First, in S901, the communication-capable port determination unit 409 starts network searching based on the WSD protocol in order to try detecting devices present on the network.

In S902, the communication-capable port determination unit 409 judges whether or not a device is successfully detected as a result of the device search in S901. In the present embodiment, specifically, in a case where a device specified by the network information of the desired device stored in S704 is detected, it is considered that the device detection has succeeded. In a case where the judgement result of the present step is YES, the processing proceeds to S903. Contrarily, in a case where the judgement result of the present step is NO, the processing proceeds to S904.

In S903, the communication-capable port determination unit 409 judges that generation of the WSD communication port is possible, and the WSD port generation possibility judgement process (S801) ends.

In S904, the communication-capable port determination unit 409 judges that generation of the WSD communication port is not possible, and the WSD port generation possibility judgement process (S801) ends.

<LLMNR Port Generation Possibility Judgement Process>

Figure 10:
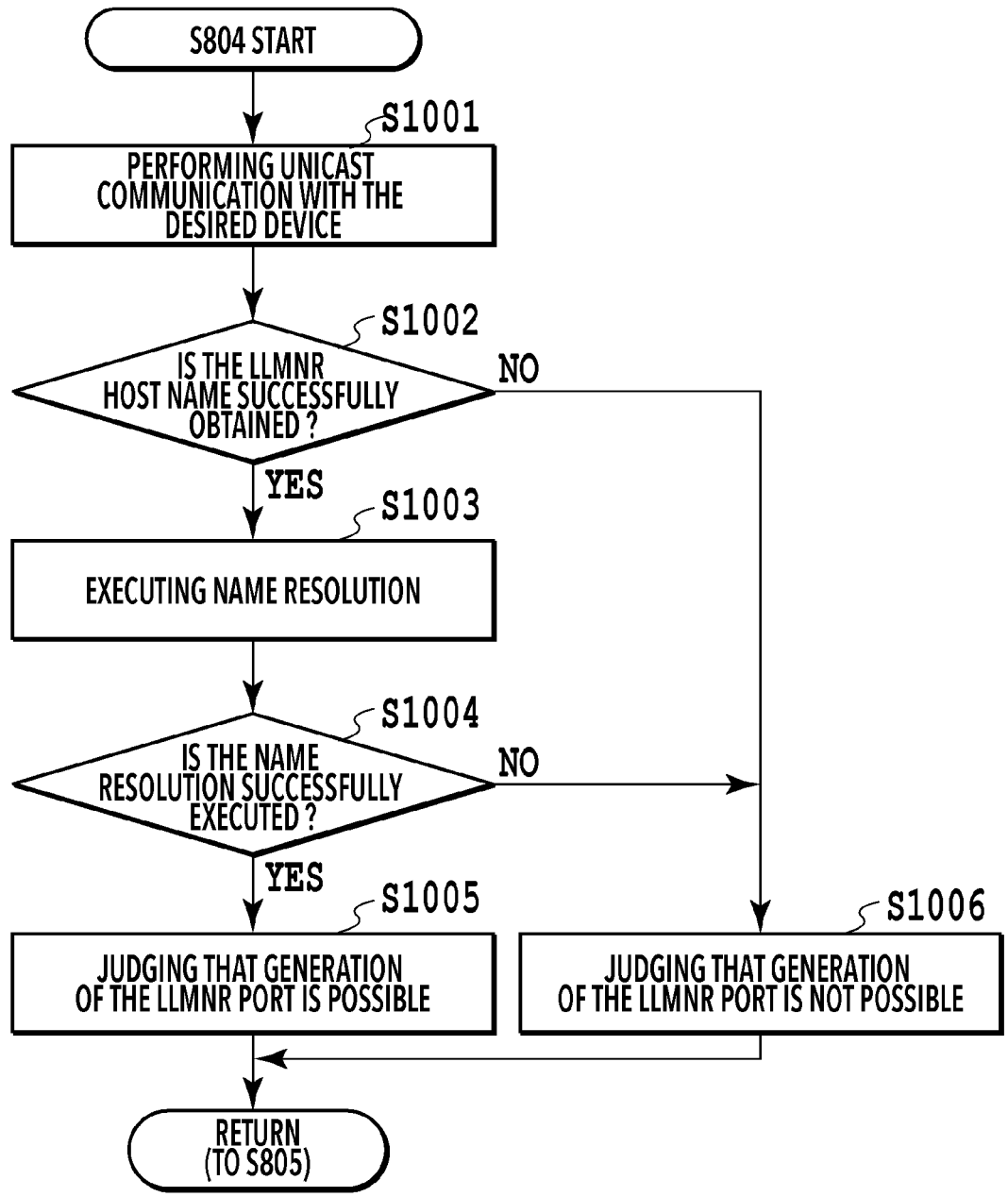
FIG. 10 is a flowchart of an LLMNR port generation possibility judgement process in the first embodiment.

FIG. 10 is a flowchart illustrating the flow of the LLMNR port generation possibility judgement process (S804 in FIG. 8).

First, in S1001, the communication-capable port determination unit 409 performs unicast communication with the desired device, based on the network information of the desired device stored in S704. The reason for performing unicast communication in the present step is to obtain the LLMNR host name, which is set for the desired device.

In S1002, the communication-capable port determination unit 409 judges whether or not the LLMNR host name is successfully obtained. In a case where the judgement result of the present step is YES, the processing proceeds to S1003. Contrarily, in a case where the judgement result of the present step is NO, the processing proceeds to S1006.

In S1003, the communication-capable port determination unit 409 executes name resolution by use of the LLMNR host name obtained in S1001.

In S1004, the communication-capable port determination unit 409 judges whether the name resolution in S1003 is successfully executed. In a case where the judgement result of the present step is YES, the processing proceeds to S1005. Contrarily, in a case where the judgement result of the present step is NO, the processing proceeds to S1006.

In S1005, the communication-capable port determination unit 409 judges that generation of the LLMNR communication port is possible, and the LLMNR port generation possibility judgement process (S804) ends.

In S1006, the communication-capable port determination unit 409 judges that generation of the LLMNR communication port is not possible, and the LLMNR port generation possibility judgement process (S804) ends.

<Effect of the Present Embodiment, Etc.>

According to the present embodiment, by firstly detecting the network device 102 connected to the PC 101, the application 401 is able to execute the driver installation process (S705) and the communication-capable port determination process (S706) concurrently (parallelly). Therefore, the driver installation process can be completed faster, compared to sequentially executing each process.

Note that, in the above-described case, although the WSD protocol and the LLMNR protocol are used in the communication-capable port determination process (S706 in FIG. 7B), the present embodiment is not limited as such. For example, other protocols such as the IPP (Internet Printing Protocol) and DNS (Domain Name System) may be additionally used, and these other protocols may be used instead of the WSD protocol and the LLMNR protocol.

Further, in the above-described case, although the priority order of communication ports to be generated is the order of the WSD, the LLMNR, and a fixed IP address, the present embodiment is not limited as such, and a given priority order can be adopted. For example, another protocol may be added, such as the DNS, the WSD, the LLMNR, and a fixed IP address, or the priority order may be changed in accordance with convenience for the application 401 and the device 102.

Further, according to the specification in the above-described case, although the application 401 automatically determines a communication-capable port (S706), it is also possible that a screen for designating a port to be generated is additionally prepared as a GUI of the application, so that the user designates the communication port to be generated, for example. Here, in a case where the generation of the determined communication-capable port fails, it is possible that a screen for notification of the failure is displayed or that the application 401 automatically determines and generates an alternative communication-capable port.

Further, in the above-described case, after the user selects the desired device (S703) on the device search result screen 501, the communication-capable port determination process (S706) is executed. However, it is also possible to execute the communication-capable port determination process (S706) immediately after a device is detected in the device search process (S701). Note that, in a case of searching for connected devices with multiple interfaces (the network and USB, etc.) as in the present embodiment, since there is a possibility that the user selects a USB device, the communication-capable port determination process (S706) may end up useless. In this way, in a case of performing a device search across multiple interfaces, it is better to let the user designate the desired device and desired interface and then perform the communication-capable port determination process (S706), which has the advantage of not having to send unnecessary packets.

Further, as illustrated in FIG. 13A-1 and FIG. 13A-2 and FIG. 13B, generally speaking, conventional driver installers firstly install a device driver, then selects a method for connecting to the device, and then starts network searching, so as to execute a port generation process according to a desired device selected by the user. However, as in the present embodiment, by consolidating the results of a simultaneous search with multiple interfaces or the driver installation process and the port generation process into one screen, such an advantage that the number of UI screens and the number of user operation steps are suppressed as illustrated in FIG. 7A is achieved, compared to FIG. 13A-1 and FIG. 13A-2.

Second Embodiment

In the present embodiment, a method for preferably determining a communication-capable port in a case where the number of communication-capable ports increases will be explained with reference to FIG. 11. Note that the explanation of the configurations overlapping with the first embodiment is omitted.

<Communication-Capable Port Determination Process>

Figure 11:
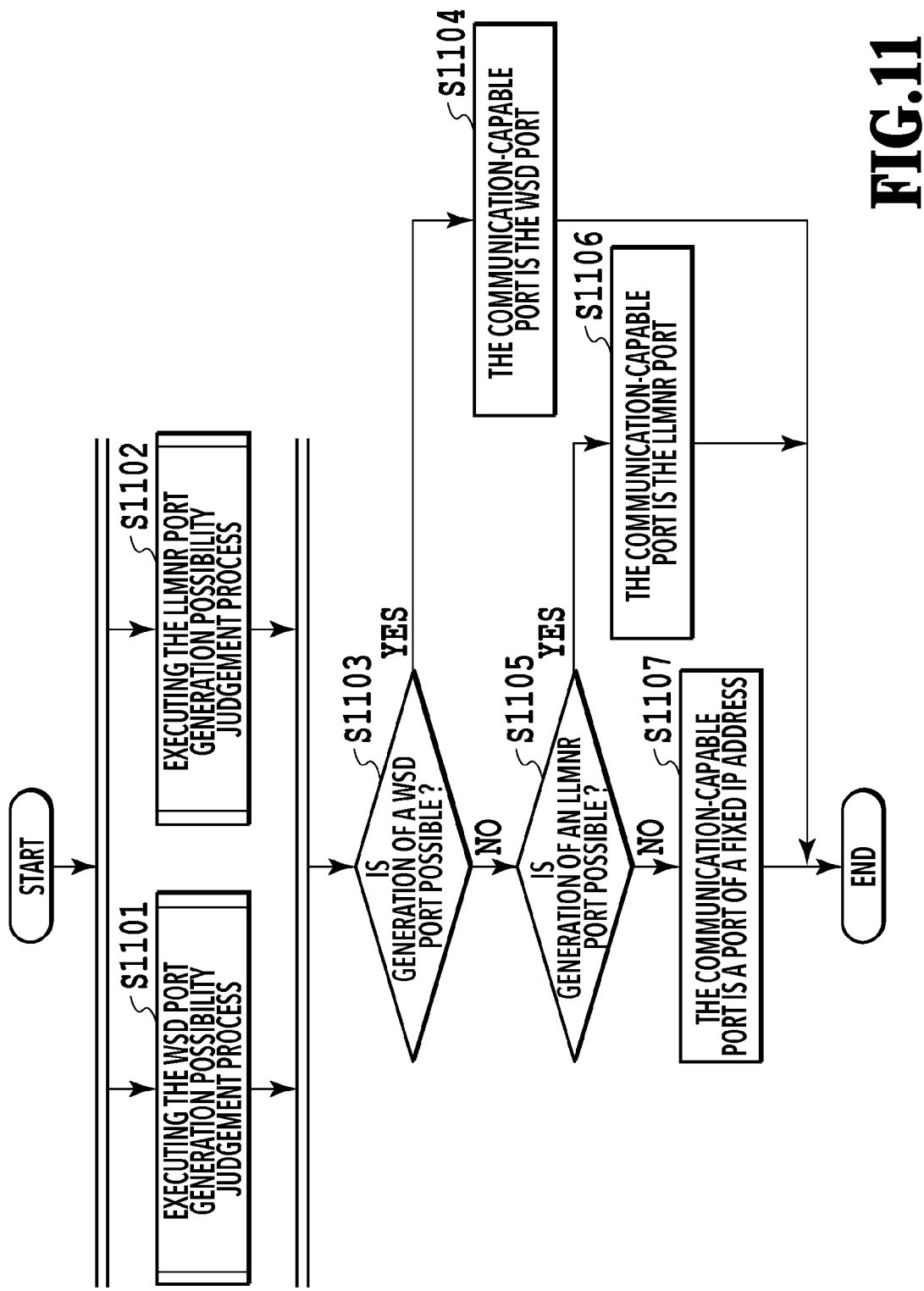
FIG. 11 is a flowchart of the communication-capable port determination process in the second embodiment.

FIG. 11 is a flowchart illustrating the flow of the communication-capable port determination process (S706) in the present embodiment.

First, the communication-capable port determination unit 409 executes the WSD port generation possibility judgement process in S1101 and the LLMNR port generation possibility judgement process in S1102 concurrently (parallelly).

In S1103, the communication-capable port determination unit 409 judges whether generation of a WSD communication port is possible, based on the result of executing the WSD port generation possibility judgement process in S1101. In a case where the judgement result of the present step is YES, the processing proceeds to S1104. Contrarily, in a case where the judgement result of the present step is NO, the processing proceeds to S1105.

In S1104, the communication-capable port determination unit 409 determines that the communication-capable port is the WSD port, and the communication-capable port determination process ends.

In S1105, the communication-capable port determination unit 409 judges whether generation of an LLMNR communication port is possible, based on the result of executing the LLMNR port generation possibility judgement process in S1102. In a case where the judgement result of the present step is YES, the processing proceeds to S1106. Contrarily, in a case where the judgement result of the present step is NO, the processing proceeds to S1107.

In S1106, the communication-capable port determination unit 409 determines that the communication-capable port is the LLMNR port, and the communication-capable port determination process ends.

In S1107, the communication-capable port determination unit 409 determines that the communication-capable port is a port of a fixed IP address, and the communication-capable port determination process ends.

<Effect of the Present Embodiment, Etc.>

According to the present embodiment, even though the number of communication ports that can be generated by the application 401 increases, the processing time in the communication-capable port determination process (S706) can be reduced, compared to sequentially executing the process of judging whether generation of each communication port is possible or not.

In addition, in the above-described case, after the process of judging whether generation of each port is possible or not (S1101 and S1102) is completed, the result of judging whether generation of each port is possible or not is checked in descending order of the priority order (in the case of NO in S1103, the processing proceeds to S1105). However, the present embodiment is not limited as such. For example, consider a case in which the WSD port generation possibility judgement process (S1101) is completed first during concurrent processing of S1101 and S1102 and the WSD port has a higher priority than the LLMNR port in terms of the priority order of communication ports to be generated. In such a case, it is also possible to complete the communication-capable port determination process (S706) without waiting for the completion of the LLMNR port generation possibility judgement process. That is, based on the result of a judgement process of a higher priority order for generating a communication port, it is also possible to complete the communication-capable port determination process (S706) once it is judged that generation of a communication port with the higher priority order is possible.

Third Embodiment

In the above-described embodiment, the explanation is given of the technology in which the application 401 executes the driver installation process (S705) and the communication-capable port determination process (S706) concurrently (parallelly), in order to solve the problem that the processing time of the application 401 becomes long. In the present embodiment, with reference to FIG. 12, an explanation is given of the technology for further shortening the processing time of the application 401 by shortening a queue generation time period in addition of the concurrent processing of the driver installation process and the communication-capable port determination process. Note that the explanation of the configurations overlapping with the above-described embodiments is omitted.

<Processing of the Application 401>

Figure 12:
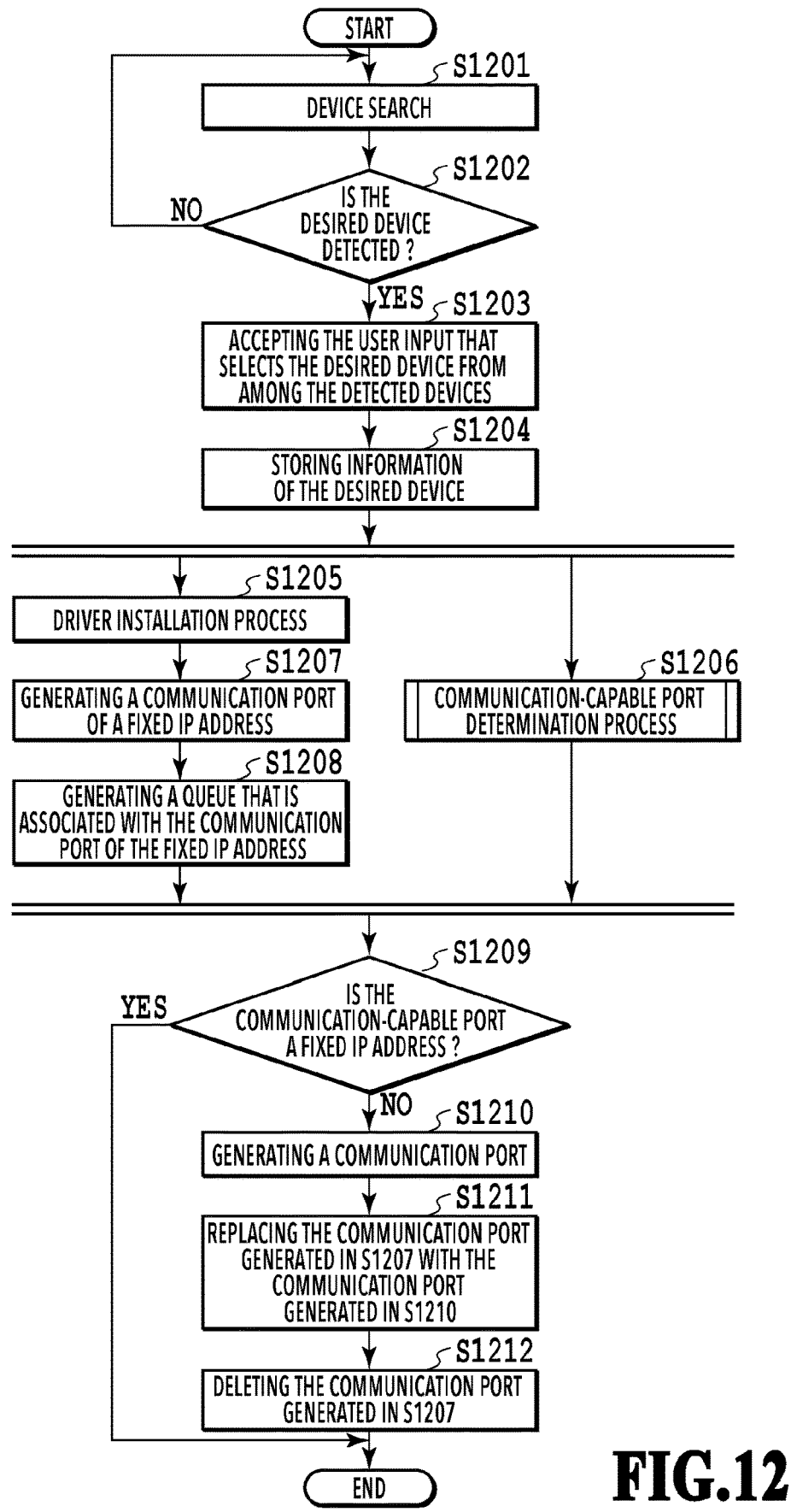
FIG. 12 is a flowchart illustrating an overall processing flow of the application 401 in the third embodiment.
Figures 2, 13A:
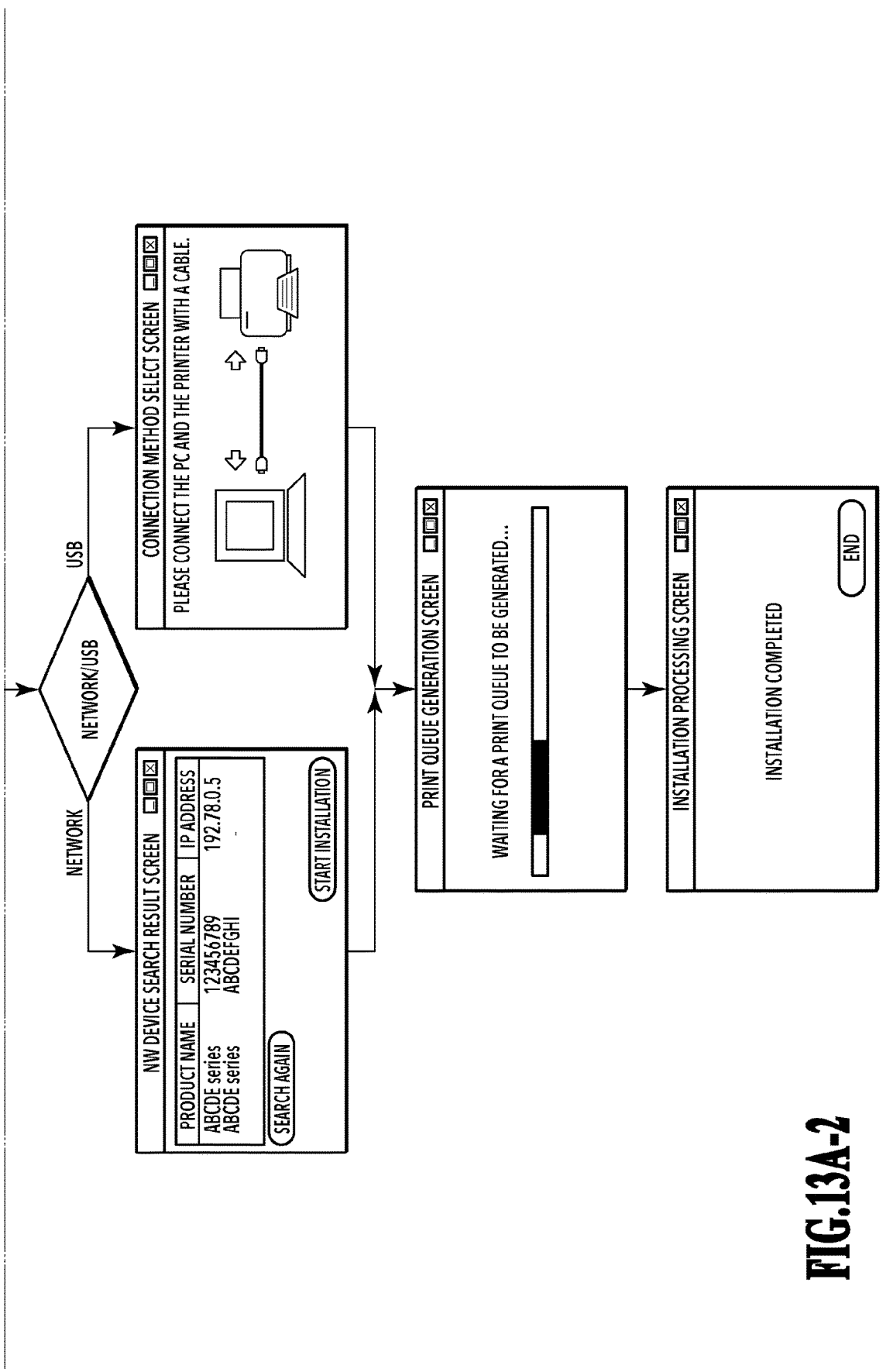
Figure 13B:
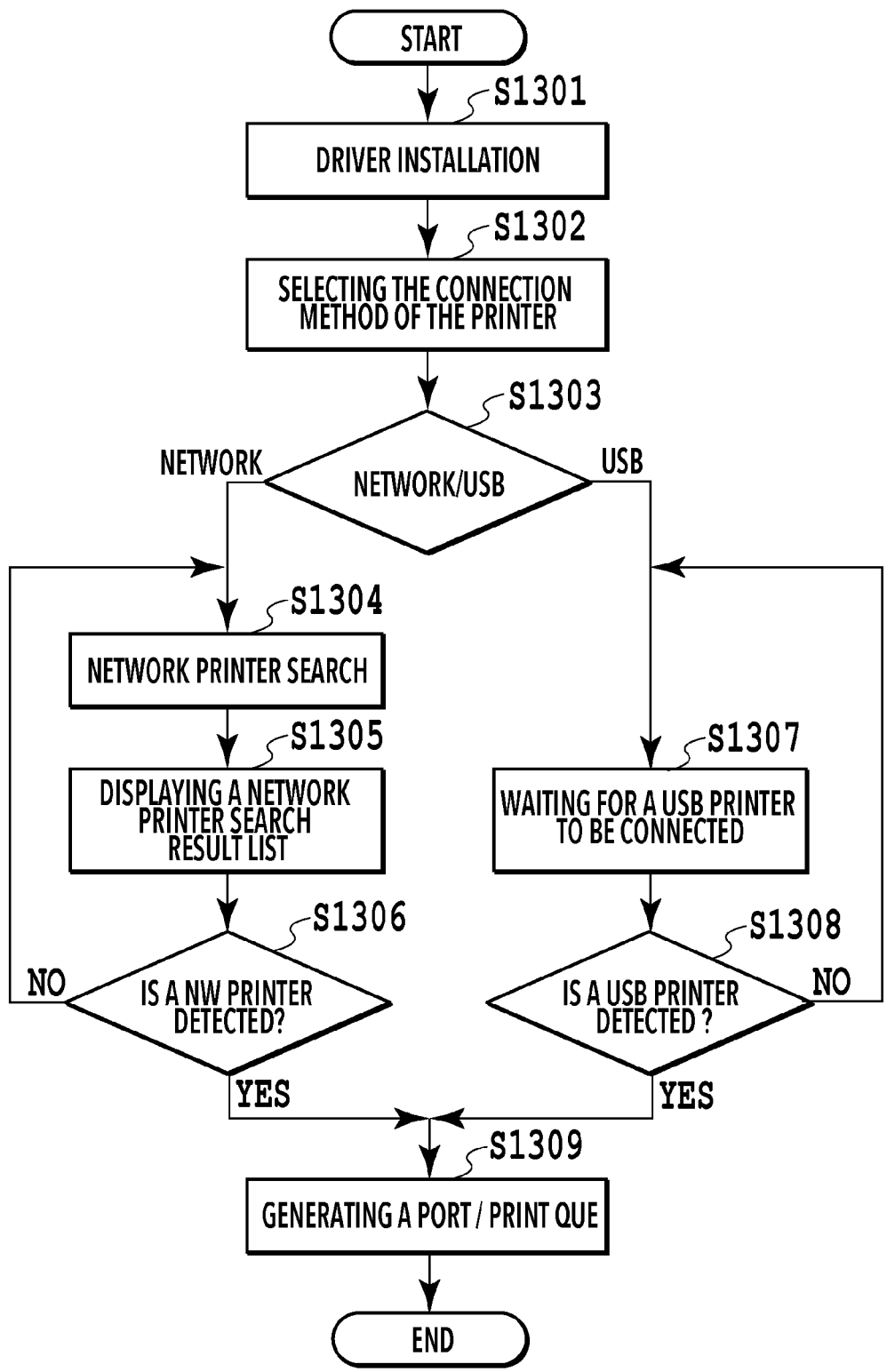

Hereinafter, the processing executed according to the application 401 in the present embodiment will be explained with reference to FIG. 12. FIG. 12 is a flowchart illustrating the overall processing flow in a case where the CPU 202 executes a program of the application 401 according to the present embodiment. Note that, since the processes of S1201 through S1204 are equivalent to the processes of S701 through S704 of FIG. 7B, the explanations thereof are omitted.

In a case where the GUI of the application 401 displayed on the monitor 201 is switched from the device search result screen to the screen 601 for driver installation, the CPU 202 executes the driver installation process of S1205 and the communication-capable port determination process of S1206 concurrently (parallelly). Here, the driver installation process is executed by the driver installation unit 408, and the communication-capable port determination process is executed by the communication-capable port determination unit 409.

In a case where the driver installation unit 408 completes the driver installation process (S1205), in S1207, the communication port generation unit 410 generates a communication port of a fixed IP address using the IP address information of the desired device stored in advance in S1204.

In S1208, the queue generation unit 411 generates a queue that is associated with various drivers installed by the driver installation unit 408 in S1205 and the communication port of the fixed IP address generated by the communication port generation unit 410 in S1207.

In a case where the generation (S1208) of the queue that is associated with the communication port of the fixed IP address is completed by the queue generation unit 411 and the communication-capable port determination process (S1206) is completed by the communication-capable port determination unit 409, the CPU 202 finishes the concurrent processing.

After the concurrent processing is completed, in S1209, the communication port generation unit 410 checks the result of the communication-capable port determination process of S1206 and judges whether the communication-capable port is a port of a fixed IP address. In a case where the judgement result of the present step is YES, the CPU 202 displays the screen showing that the driver installation process is completed (see FIG. 6B), and the series of the processes ends. Contrarily, in a case where the judgement result of the present step is NO, the processing proceeds to S1210.

In S1210, the communication port generation unit 410 generates a communication port according to the result of the communication-capable port determination process of S1206.

In S1211, as for the communication port to be associated with the queue generated by the queue generation unit 411 in S1208, the CPU 202 replaces the communication port of the fixed IP address generated in S1207 with the communication port generated in S1210.

In S1212, the CPU 202 deletes the communication port of the fixed IP address generated in S1207. Upon completion of the process of deleting the communication port of the fixed IP address in S1212, the CPU 202 displays the screen showing that the driver installation process is completed (FIG. 6B), and the series of the processes ends.

<Effect of the Present Embodiment>

As explained above, according to the present embodiment, it can be expected that a time period for generating a print queue is shortened as well. Therefore, a further reduction in the processing time of the application 401 can be expected as compared with the above-described embodiments.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to an embodiment of the present invention, it is possible to suppress an increase in the time required for setting a peripheral device.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-223754 filed Dec. 11, 2019, which is hereby incorporated by reference wherein in its entirety.

What is claimed is:

1. A control method comprising:
   searching a peripheral device that is capable of communicating via a network;
   causing a display unit to display information of each of detected peripheral devices as a search result from the searching step;
   causing a storage unit to store information of a peripheral device selected by a user from among the detected peripheral devices;
   executing an installation process for installing a driver that is compatible with the selected peripheral device; and
   executing a communication-capable port determination process for determining a port that is capable of communicating with the selected peripheral device, based on the information stored in the storage unit,
   wherein the installation process and the communication-capable port determination process are executed concurrently by the installation process being started after the communication-capable port determination process is started and before the communication-capable port determination process is completed or the communication-capable port determination process being started after the installation process is started and before the installation process is completed.

2. The control method according to claim 1 further comprising:
   executing a port generation process for generating the port that is capable of communicating with the selected peripheral device according to a result of the communication-capable port determination process after concurrent processing of the installation process and the communication-capable port determination process is completed; and
   generating a queue that is associated with the driver installed by the installation process and the port generated by the port generation process.

3. The control method according to claim 1,
   wherein the communication-capable port determination process includes a first judgement step for judging whether generation of a communication port based on a first network protocol is possible or not, and
   wherein, in a case where it is judged to be possible by the first judgement process, it is determined, by the communication-capable port determination process, that the communication-capable port is the communication port based on the first network protocol.

4. The control method according to claim 3, wherein, in the first judgement process,
   searching is performed on the network by use of the first network protocol and,
   in a case where a peripheral device that is specified by the information stored in the storage unit is detected on the network, it is judged that generation of the communication port based on the first network protocol is possible, whereas, in a case where the peripheral device that is specified by the information stored in the storage unit is not detected on the network, it is judged that generation of the communication port based on the first network protocol is not possible.

5. The control method according to claim 3,
   wherein the communication-capable port determination process includes a second judgement process for judging whether generation of a communication port based on a second network protocol is possible or not in a case where it is judged not to be possible by the first judgement process, and
   wherein, in a case where it is judged to be possible by the second judgement process, it is determined, by the communication-capable port determination process, that the communication-capable port is the communication port based on the second network protocol.

6. The control method according to claim 5, wherein the second judgement process includes
   an obtainment process for obtaining a host name, which is set for the selected peripheral device, by performing unicast communication with the selected peripheral device and
   a name resolution process for executing name resolution by use of the host name obtained by the obtainment process.

7. The control method according to claim 6, wherein, in the second judgement process,
   whereas it is judged that generation of the communication port based on the second network protocol is possible in a case where the name resolution by the name resolution process succeeds,
   it is judged that generation of the communication port based on the second network protocol is not possible in a case where obtainment of the host name by the obtainment process fails or in a case where the name resolution by the name resolution process fails.

8. The control method according to claim 5, wherein, in a case where it is judged not to be possible by the second judgement process, it is determined, by the communication-capable port determination process, that the communication-capable port is a communication port using a fixed IP address, which is the information stored in the storage unit.

9. The control method according to claim 1, wherein the communication-capable port determination process includes
   a first judgement process for judging whether generation of a communication port based on a first network protocol is possible or not and a second judgement process for judging whether generation of a communication port based on a second network protocol is possible or not,
wherein a judgement process by the first judgement process and a judgement process by the second judgement process are executed concurrently.

10. The control method according to claim 9, wherein, after concurrent processing of the judgement process by the first judgement process and the judgement process by the second judgement process is completed, in a case where it is judged to be possible by the first judgement process, it is determined, by the communication-capable port determination process, that the communication-capable port is the communication port based on the first network protocol.

11. The control method according to claim 10,
wherein, in a case where it is judged not to be possible by the first judgement process and it is judged to be possible by the second judgement process, it is determined, by the communication-capable port determination process, that the communication-capable port is the communication port based on the second network protocol, and
wherein, in a case where it is judged not to be possible by the first judgement process and it is judged not to be possible by the second judgement process, it is determined, by the communication-capable port determination process, that the communication-capable port is a communication port using a fixed IP address, which is the information stored in the storage unit.

12. The control method according to claim 1 further comprising:
a port generation step for executing a first communication port generation process in which a first communication port using a fixed IP address, which is the information stored in the storage unit, is generated after the installation process is completed; and
a generation step for executing a queue generation process for generating a queue that is associated with the driver installed by the installation process and the first communication port,
wherein the installation process by the installation step, the first communication port generation process by the port generation step, and the queue generation process, and the communication-capable port determination process are executed concurrently.

13. The control method according to claim 12,
wherein, in a case where the communication-capable port is not the first communication port, a second communication port that is capable of communicating with the selected peripheral device is generated by the port generation process according a result of the communication-capable port determination process, and
wherein, as for a communication port that is associated with the queue, the first communication port is replaced with the second communication port.

14. An information processing apparatus comprising:
a searching unit configured to search a peripheral device that is capable of communicating via a network;
a display control unit configured to cause a display unit to display information of each of detected peripheral devices as a search result from the searching unit;
a storage control unit configured to cause a storage unit to store information of a peripheral device selected by a user from among the detected peripheral devices;
an installation unit configured to execute an installation process to install a driver that is compatible with the selected peripheral device; and
a communication-capable port determination unit configured to execute a communication-capable port determination process to determine a port that is capable of communicating with the selected peripheral device, based on the information stored in the storage unit,
wherein the installation process and the communication-capable port determination process are executed concurrently by the installation process being started after the communication-capable port determination process is started and before the communication-capable port determination process is completed or the communication-capable port determination process being started after the installation process is started and before the installation process is completed.

15. A non-transitory computer readable storage medium storing a program for causing a computer to execute a control method comprising:
searching a peripheral device that is capable of communicating via a network;
causing a display unit to display information of each of detected peripheral devices as a search result from the searching step;
causing a storage unit to store information of a peripheral device selected by a user from among the detected peripheral devices;
executing an installation process for installing a driver that is compatible with the selected peripheral device; and
executing a communication-capable port determination process for determining a port that is capable of communicating with the selected peripheral device, based on the information stored in the storage unit,
wherein the installation process and the communication-capable port determination process are executed concurrently by the installation process being started after the communication-capable port determination process is started and before the communication-capable port determination process is completed or the communication-capable port determination process being started after the installation process is started and before the installation process is completed.

* * * * *